J. H. ALLIN.
COMBINATION SHAFTS.
APPLICATION FILED MAR. 25, 1909.
1,179,152.
Patented Apr. 11, 1916.
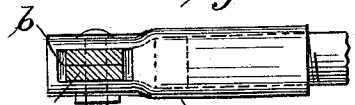
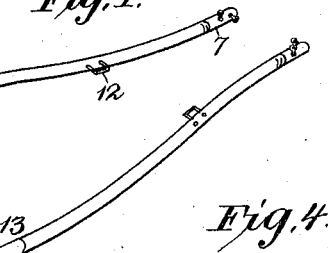
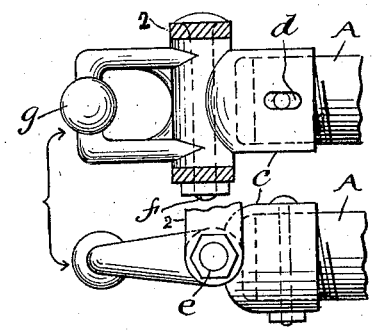
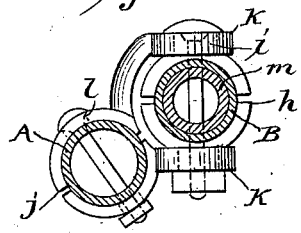
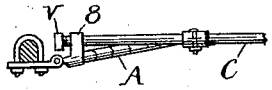
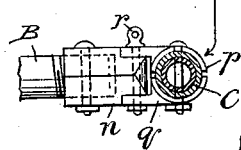
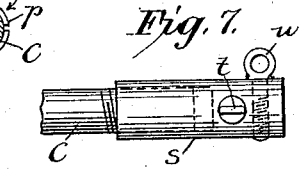
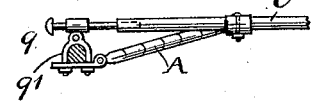
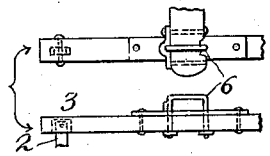
Inventor:
J. Hays Allin.

UNITED STATES PATENT OFFICE.

JAMES HAYS ALLIN, OF EAST CHATTANOOGA, TENNESSEE.

COMBINATION-SHAFTS.

1,179,152.  Specification of Letters Patent.  Patented Apr. 11, 1916.

Application filed March 25, 1909. Serial No. 485,853.

*To all whom it may concern:*

Be it known that I, JAMES HAYS ALLIN, a citizen of the United States, residing at East Chattanooga, in the county of Hamilton and State of Tennessee, (and whose post-office address is J. HAYS ALLIN, East Chattanooga, Tennessee,) have invented certain new and useful Combination-Shafts, of which the following is a specification.

The invention relates to new and useful combination shafts which constitute a part of a vehicle and also a part of a harness; and in which a pair of guiding shaft-trace elements, movable to and fro endwise, and sharing equally in the guidance, control and draft of the vehicle, are employed. And, for the full protection of such invention, I this day file three separate but companion applications each for combination shafts, and of successive serial numbers beginning with this. I also filed, May 29, 1907, a companion application, covering "means for detachably and interchangeably connecting common and shaft traces to hames or other parts of a harness," Serial No. 376,273.

In this invention, the two side shaft members are converted into guiding-shaft-trace elements movable to and fro endwise, and the whiffletree is likewise converted into a guiding-draft-whiffle-element by hinging the shaft-trace-elements, intermediate their ends, to the respective ends of the whiffletree element of the vehicle, and by movably connecting the rear ends of the guiding-shaft-trace elements respectively to the vehicle; and substantially as illustrated in the drawings. Thus these combination shafts are adapted to all styles of vehicles. And they are also adapted to all styles of harness, by being provided, as illustrated, with permanent means for harness attachments in three different localities thereon,—preferably at the tips, for direct attachment to the shoulder member of the harness; at the back band locality, for attachment to short tugs, and at the whiffletree connections for attachment to and use with long tug harness, the same as common shafts, when emergency or necessity may require.

The draft and controlling elements of this combination-harness may consist simply in these combination shafts detachably hinged to a hameless steel collar, to common hames and collar, or to a breast harness in combination with the means commonly used in two-horse or pole harness for holding the shoulder member down or back against the shoulders of the draft animal. It should be observed, for instance, that a most excellent combination metallic harness may be provided by a hameless steel collar detachably hinged to the tips of a pair of these combination steel shafts; when combined, for holdback purposes, with a light back-and-belly band, or a surcingle, and a choke or pole-strap securing the bottom of the collar to the belly-band or surcingle; or when combined, for hold-back purposes, with a crupper-strap attached to the top of the collar and a common hip-strap attached to the crupper-strap, and thence passed down and around the body of the draft-animal and united with a choke or pole strap attached to the bottom of the collar. The single rig thus harnessed may be as easily held back and controlled from the tips of these combination shafts, as the two-horse or pole rig is so universally held back and controlled from the tip of the pole by these two methods. In this way it is hoped to entirely dispense with the necessity for the usual expensive, filthy and chafing rear breeching for buggies and other light rigs. Moreover, a most excellent and simple means for using short tug breast and other common harness with these combination shafts, is provided for by the little square draft-loop, 12, on the shaft at the back-band locality. The shaft being carried by the usual back-band loop and the short tug being slotted and secured to the said draft loop 12. The belly band may also be secured to said draft loop 12. This, indeed, may prove sufficient for holding back light rigs, simply by the back and belly bands, or similar means for holding back as above described for the tips of the shafts may be employed.

The chief object of the invention is to provide for a substantial, convenient and attractive combination shaft-harness; of few parts, perfect in construction and operation, quick and easy of manipulation, humane in the extreme, sightly in appearance, comparatively inexpensive, and of finished interchangeable parts, void of right and left features, and of easy assemblance. It is also designed to thus create a practical steel harness; other than the bridle, lines and hold-back features.

Other objects are to practically dispense with the expensive parts of the harness; to absolutely dispense with the breech and trace inhumane frictional chafing, and consequent marking of the draft animal, by the use of shaft-trace elements, which stand out from the animal, and which freely and perfectly vibrate to and fro endwise in response to his holding back breech movements equally as well as to his forward draft movements, and preferably, to use light tubular elements secured together, as far as possible, by interlocking screw-threaded parts as the best method for providing perfect interchangeable commercial parts of quick and easy assemblance and of light weight.

Figure 1 is a perspective view of a device embodying my invention; Fig. 2 is a rear view of the V-shaped hinge-connector, 2, of Fig. 1; Fig. 3 is a bottom view of connection 3; Fig. 4, top and side views of connection 4; Fig. 5, a side-end view of connection 5, with the tubular guiding-draft element and tree shown in section; Fig. 6, a side-end and a top view of connection 6, and Fig. 7, a top view of connection 7; Figs. 8, 9 and 10, are side views illustrating modifications of connection 4, and respectively showing connecting means providing to and fro endwise sliding movement for the shaft-trace element relative to the vehicle; the forward end of the shaft-trace-element being shown broken away; and Fig. 11 illustrates a modified side view of connection 3, and also modified side and top views of connection 6, of Fig. 1, designed to illustrate suitable simple connecting means for wooden shaft-trace elements.

In Fig. 1, I have illustrated the forward portion of a vehicle, comprising a pair of tubular combination shafts, and the fore axle hinged together; the remainder of the vehicle not being shown. In this Fig. 1, the guiding draft element, A, is preferably designed to represent a substantially semicircular tube of special shape and design. It is here shown hinged at its ends respectively to the axle, D, by an ordinary vehicle attaching joint, and also to be hinged to the lower end of the upright V-shaped guiding-hinge-connector, 2, by a transverse laterally disposed hinge joint, as at connection 4, and in such manner as secures to said connector, 2, to and fro forward and back hinge movement in a vertical plane. This hinge-connector, 2, is preferably of one piece, folded back at the top. The guiding-draft element, A, is also shown to be centrally hinged to the center of the guiding whiffletree, B, by connection 5 and the guiding shaft element, or guiding-shaft-trace element, C, is shown to be of special shape and design, suited to either the sliding or hinge styles of these combination shaft connections. It is here shown hinged at its rear end to the upper end of the said V-shaped guiding hinge connector, 2, by connection 3; and also to be hinged intermediate its ends to the end of the guiding whiffletree, B, by connection 6. These shaft-trace elements may be of standard lengths, and suited to either the hinge or sliding connections at their rear ends. The arrangement is such that all these elements become guiding elements of the vehicle, and the guiding-shaft-trace element also moves to and fro endwise as the trace-element of the harness. The harness attaching means shown in three different places on the shaft-trace element, may amply provide for attaching any and all styles of harness.

Connection 3 is shown in Figs. 1 and 3, comprising a connector, $a$, mounted on the rear end of the shaft-trace element, C, by interlocking screw-threaded parts. The parallel dotted double lines shown in the joint of this and similar connections in the drawings designate the screw threaded interlocking of the parts. The connector, $a$, is also shown provided with an oblong socket, $b$, therein, open at the bottom, and closed at the top, for cleanliness of joint and neatness in appearance, and with the upper end of the upright V-shaped hinge connector, 2, hingedly bolted thereto, within socket $b$. The length of the oblong socket, $b$, is shown sufficient to allow only limited forward and back hinge movement for the shaft-trace element, C, with and relative to the guiding-hinge-connector, 2.

Connection 4 is shown in Figs. 1 and 4, comprising a triple-joint-connector, $c$, mounted on the end of the guiding-draft-element, A, by interlocking screw-threaded parts; and also bolted thereto against turning thereon; and the bolt-hole, $d$, in the said connector, $c$, is shown slightly oblong for easy adjustment of the bolt-holes, as illustrated in the top view thereof where the bolt is omitted for this purpose. The bolting or otherwise securing of this joint against turning is of special and vital functional value in rigidly sustaining the said guiding-hinge connector, 2, in its proper upright guiding relations. This triple-joint connector, $c$, is also shown provided with a lateral transverse socket, $e$, therein, carrying a bolt, $f$, hingedly securing the open ends of the upright V-shaped hinge-connector, 2, thereto, and with forward and back hinged relations thereto, and movable substantially in a vertical plane. This upright V-shaped hinge connector, 2, is preferably so constructed to the better secure perfect sidewise guiding functions to the shaft-trace element, as well as being the strongest and cheapest form of guiding hinge construction. It may, however, be made in any desirable form. The third connecting means of this triple-joint-connector, $c$, is the vehicle attacher, $g$, the which may be of any desirable form.

Connection 5 is shown in Figs. 1 and 5, as comprising a divided-draft-sleeve, $h$, on the tubular whiffle-tree, B, and having a pair of duplicate draft tugs, $i$, thereon, and a divided draft sleeve, $j$, on the guiding-draft element A, having a pair of companion draft-jaws, $k\ k$, thereon, with sockets therein engaging the said draft tugs, $i$, on the whiffle-tree A and a bolt passed through the draft tugs $i$, and through the tree, clampingly secures the divided draft-sleeve, $h$, to the whiffletree, and also hingedly secures the draft-jaws, $k\ k$, to the tugs $i$; and a bolt, passed through the bolt holes, $l$, in the divided draft-sleeve, $j$, and through the guiding draft-element A, clampingly secures the sleeve, $j$, to the guiding-draft element. The bolt-holes, $l$, in the divided draft-sleeve, $j$, are preferably made oblong, as indicated by dotted lines, for adjusting the sleeve to different angles on the guiding-draft-element. The tubular whiffletree, B, is shown with a tubular sleeve, $m$, therein, designed to be of suitable length to strengthen the center of the tree. The divided draft sleeves $h$, and $j$, shown in the drawings, may be divided on one side only, or may be undivided sleeves if preferred.

Connection 6 is shown in Figs. 1 and 6, as comprising a draft-sleeve, $n$, mounted on the end of the whiffletree by interlocking screw-threaded parts, and then bolted thereto against turning thereon; the bolt-holes in the sleeve being preferably oblong as shown, for easy adjustment to the bolt-hole in the tree, and sleeve, $n$, is shown with an engaging shoulder, $o$, on the end thereof, and with a connecting socket therein for hinge-connection with the shaft-trace element; and a divided draft-sleeve, $p$, on and bolted to the shaft-trace element, and having a pair of duplicate socketed draft-jaws, $q$, thereon, is shown hingedly engaging the socketed end of the draft-sleeve, $n$, on the whiffletree by means of a bolt. This bolt, $r$, is preferably shown with a head thereon adapted for attaching a common trace thereto. The said shoulder, $o$, by engaging the side of the shaft, limits the to and fro endwise movement of the shaft-trace element. The divided draft sleeve, $p$, may be integral, or simply divided between the jaws, as preferred. The square end of the tree may suffice for the shoulder, $o$. The tubular shaft, C. is shown strengthened at this joint by a tube inserted therein.

Connection 7, of Figs. 1 and 7, shows a draft-sleeve, $s$, detachably and rotatably mounted on the tip of the shaft-trace element, C, by interlocking screw-threaded parts and having a smooth-surfaced draft socket, $t$, therein, for breast harness attachment, and also having a screw-threaded socket therein, carrying a correspondingly screw-threaded connector, $u$; said connector, $u$, being transversely socketed for detachable connection with collar and hames harness. This connection 7 provides for triple-jointed harness attachment to meet all possible movements of the draft animal.

Connection 8, of Fig. 8, shows the rear end of the shaft trace element, C, movably mounted within a guiding-sleeve, which is mounted on the rear end of the guiding-draft-element, A. A cap, $v$, fitted to the end of the shaft by screw-threaded parts, secures the shaft within the said guiding-sleeve.

Connection 9, of Fig. 9, shows a guiding bolt secured to the rear end of the shaft-trace element, C, and a guiding sleeve mounted on the said guiding bolt, and hinged to the axle-clip-connector, $9^1$, shown in Figs. 1, 9 and 10.

Connection 10, of Fig. 10, shows a guiding bolt having its head end movably secured within the rear end of the shaft-trace element, C, by a cap-sleeve, W, closely fitting the bolt and mounted on the end of the shaft by interlocking screw-threaded parts, and the small end of the guiding bolt to be hinged to the axle-clip-connector, $9^1$, shown in Figs. 1, 9 and 10. The hinge end of the guiding-bolt is slipped through the cap-sleeve before attaching the cap-sleeve to the shaft. The endwise movement of the shaft-trace-element is shown to be limited in each of Figs. 1, 8, 9 and 10. Such limitations serve to sustain these combination shafts in their proper upright shape and relations of parts at all times. The said axle-clip-connector, $9^1$, of Figs. 1, 9 and 10, is shown in Fig. 1, to be provided with a pair of jaws, $x$, for hinging the connecting means of Figs. 9 and 10 between said jaws, and for hinging the lower ends of the V-shaped guiding-hinge connector, 2, of Figs. 1 and 11, to the outsides of said jaws, when it is desirable to so hinge said hinge-connector, 2, directly to the axle in place of to the guiding-draft-element of the vehicle. The said V-shaped guiding hinge connector, 2, is identical in Figs. 1 and 11, but is shown broken away in Fig. 11.

In carrying the invention into effect, the arrangement is such that different modes may be employed for movably connecting the rear end of the shaft-trace-element to the vehicle. For instance: where it is desirable to carry the rear end of the shaft-trace-element high above that part of the vehicle to which it is movably attached, an intervening upright guiding hinge connector may be employed for hinging the rear end of the shaft-trace-element to the axle or to the guiding-draft element of the vehicle, and substantially as illustrated in Fig. 1, by connector 2, in combination with connection 4, or in combination with the axle-clip connector, $9^1$; and where it is desirable to carry the rear end of the shaft-trace element low, relative to the parts of the vehicle to which it is movably attached, a sliding sleeve connecting means may be employed, such as illustrated in Figs. 8, 9 and 10. Generally speaking, the upright, intervening hinge connector means, such as 2, is preferable for buggies and other light rigs, and the sliding sleeve connecting means for heavier draft vehicles.

It will be observed that the same shaft-trace element is usable on either the right or the left side of the vehicle by simply adjusting the connections; for a shaft element void of vertical bend may be usable either side up or down or right or left, and that it may be of one piece, and desirably tapered, or it may be divided as illustrated at 13, in which case a smaller tube may form the forward part of the shaft, and thus give taper to the tubular shaft, or the shaft may be divided at connection 6, and all the connections may be mounted on the rear portion. The latter division may prove to be the preferred arrangement. It will be observed that in this latter case, the shaft-trace element could be interchangeable with the shaft-trace element of the said companion application next following this. These shaft-trace elements may be of finished, interchangeable commercial design, such as any teamster may put together. Indeed, the same may be true of all parts of these combination shafts.

I claim:

1. A pair of combination shafts comprising a substantially semi-circular guiding draft element, a pair of triple-joint connectors, mounted on the ends of the guiding-draft-element by corresponding interlocking screw-threaded parts, and then bolted thereto against turning thereon, a pair of upright V-shaped guiding-hinge-connectors, each having its open end turned downward, and hingedly secured to the two opposite sides of one of the triple-joint connectors, and hingedly movable to and fro forward and back in a vertical plane, a guiding-draft whiffletree centrally hinged to the center of the guiding-draft element, and a pair of movable shaft elements respectively hinged by limited hinge joints to the ends of the guilding draft whiffle-tree and to the upper ends of the guiding hinge-connectors, and movable to and fro endwise and sharing equally in the guidance, control and draft of the vehicle; means on the triple-joint connectors for vehicle attachment and means on the guiding shaft-trace elements for harness attachments.

2. A pair of combination shafts, comprising a centrally disposed guiding-draft element, a guiding-draft whiffletree centrally mounted on the guiding-draft element, and a pair of guiding shaft elements movably connected respectively to the guiding-draft element and to the guiding-draft whiffletree, and means respectively for vehicle and harness attachments.

3. The combination, in a vehicle having a guiding-draft whiffletree centrally disposed as to the draft of the vehicle, of a pair of guiding-shaft elements having to and fro endwise movable connection with the vehicle and laterally disposed hinge connection with the guiding-draft whiffle-tree.

4. The combination, in a vehicle having a guiding-draft-whiffletree centrally disposed as to the draft of the vehicle, of a guiding-shaft-element provided with means for laterally disposed hinge connection with the guiding-draft-whiffletree, and also provided with means for to and fro endwise movable connection with the vehicle.

5. The combination, in a vehicle having a guiding-draft whiffletree centrally disposed as to the draft of the vehicle, and a guiding-shaft-element hinged to the end of the whiffletree, of a guiding-hinge-connector intervening and hingedly connecting the guiding shaft element to the vehicle.

6. The combination of a substantially semi-circular guiding-draft element, a guiding-draft whiffletree hinged to the forward portion thereof, a guiding-shaft element having hinged connection with the whiffletree, and also to and fro endwise movable connection with the guiding-draft element.

7. The combination, in combination shafts having a guiding-draft-element, a whiffletree centrally hinged to the forward portion of the guiding-draft-element, a movable shaft-trace-element hinged to the end of the whiffletree and movable endwise relative to the guiding-draft element, of a triple-joint connector, connecting means for securing said triple-joint-connector to the rear end of the guiding-draft-element, connecting means for movably securing the rear end of the movable-shaft-trace-element to the triple-joint connector, and means for attaching the triple-joint connector to a vehicle.

8. A pair of combination shafts comprising a centrally disposed guiding-draft element, a guiding-draft whiffletree centrally mounted thereon, and a pair of guiding-shaft elements hingedly connected respectively to the guiding-draft-element and to the guiding-draft whiffletree, and means respectively for vehicle and harness attachments.

9. A pair of combination shafts, comprising a guiding-draft-element, a guiding-draft-whiffletree centrally mounted thereon, and a pair of guiding-shaft-elements hinged to the ends of the guiding-draft whiffletree respectively and also movably mounted at their rear ends respectively on the guiding-draft element, and means respectively for vehicle and harness attachments.

10. A pair of combination shafts comprising a substantially semi-circular guiding-draft element a guiding-draft whiffletree centrally mounted thereon, and a pair of guiding-shaft elements movably connected respectively to the guiding-draft element, and also to the guiding draft-whiffletree, and means respectively for vehicle and harness attachments.

11. A pair of combination shafts comprising a guiding-draft-element, a whiffletree mounted thereon, a pair of guiding-shaft elements respectively hinged to the whiffletree, and a pair of guiding-hinge-connectors intervening and hingedly connecting the guiding-shaft elements respectively to the guiding-draft-element, and means respectively for vehicle and harness attachments.

12. A pair of combination shafts comprising a guiding-draft element, a guiding draft whiffletree mounted thereon, and a pair of guiding-shaft elements having laterally disposed hinge connection respectively with the guiding-draft whiffletree, and to and fro endwise movable connection respectively with the vehicle, and means respectively for vehicle and harness attachments.

13. A pair of combination shafts comprising a guiding-draft-element, a guiding-draft-whiffletree mounted thereon, a pair of guiding-shaft elements having laterally disposed hinge connection respectively with the guiding-draft-whiffletree, means respectively for vehicle and harness attachments, and a pair of V-shaped guiding-hinge connectors intervening and hingedly connecting the guiding-shaft elements respectively to the vehicle.

14. A pair of combination shafts comprising a guiding-draft-element, a guiding whiffletree centrally mounted thereon, and a pair of guiding-shaft-trace elements respectively hinged to the guiding whiffletree, and also hingedly connected at their rear ends by a guiding hinge-connector and a pair of hinge-joints respectively to the guiding draft element with fixed sidewise guiding relation and movable to and fro endwise hinge relations to the guiding-draft-element; means respectively for vehicle and harness attachments.

15. The combination, in a vehicle having a guiding-draft whiffletree centrally disposed as to the draft of the vehicle, of a pair of guiding-shaft-elements having to and fro endwise movable hinge relations respectively with the whiffletree and also with the vehicle.

16. The combination, in a vehicle having a guiding-draft-whiffletree centrally disposed as to the draft of the vehicle, of a guiding-shaft-element provided with means for to and fro endwise movable hinge relations respectively with the vehicle and also with the guiding-draft-whiffletree.

17. The combination, in a vehicle having a guiding-draft-whiffletree centrally disposed as to the draft of the vehicle, of a guiding-shaft-element provided with means intermediate its ends for to and fro endwise hinge connection with the guiding-draft-whiffletree, and provided at its rear end with means for to and fro endwise movable connection with the vehicle.

18. The combination, in combination with a vehicle having a guiding-hinge connector and means for securing said connector to the vehicle, and a guiding-draft-whiffletree, and means for securing said whiffletree to the vehicle, of a guiding-shaft element provided with means for hinged connection with the guiding-draft whiffletree, and also provided with an oblong connecting slot therein, adapted for receiving and hingedly engaging the end of the guiding hinge-connector.

19. The combination, in combination with a vehicle having a guiding-hinge-connector and means for securing said connector to the vehicle, of a guiding draft whiffletree centrally disposed to the draft of the vehicle, and means for securing said whiffletree to the vehicle, and a guiding-shaft element hinged to the whiffletree, of a slotted connector, means for securing the slotted connector to the end of the guiding shaft element, and means for hingedly securing the end of the guiding-hinge connector within the slot of the slotted connector.

20. The combination, in combination with a vehicle having a guiding-hinge connector, and means for securing said connector to the vehicle, of a guiding-draft whiffletree centrally disposed as to the draft of the vehicle and means for securing said whiffletree to the vehicle, and a guiding-shaft element hinged to the whiffletree, of a slotted and socketed connector, means for securing the end of the guiding-shaft-element within the socket of the slotted and socketed connector by interlocking screw-threaded parts and means for hingedly securing the end of the guiding hinge-connector within the slot of the slotted and socketed connector.

21. The combination, in a vehicle with a guiding-draft-whiffletree hinged thereto, and a guiding-shaft-element hinged to the end of the whiffletree, of a guiding-hinge connector intervening and hingedly connecting the guiding-shaft-element, with to and fro endwise movable relations, to the vehicle.

22. The combination, in a vehicle having a guiding-draft-element and a whiffletree mounted thereon, of a shaft-trace-element and a V-shaped hinge connector having its closed end hinged to the rear end of the shaft trace element; means for hinging the open end of the V-shaped hinge connector to the vehicle and means for hinging the shaft trace-element to the end of the whiffletree.

23. The combination, in a vehicle with a guiding-draft-element and a whiffletree centrally mounted thereon, of a pair of shaft-trace-elements hingedly connected together by the whiffletree and movably connected at their rear ends respectively to the vehicle with limited endwise movement relative to the vehicle.

24. The combination, in a vehicle with a guiding-draft element, a guiding whiffletree centrally hinged thereto and a movable guiding-shaft-element hinged to the end of the whiffletree, of an upright guiding-hinge connector hingedly connecting the rear end of the guiding shaft element to another element of the vehicle and hingedly movable forward and back in a vertical plane.

25. The combination, in a vehicle, of a guiding-draft-whiffletree and a pair of guiding-shaft-trace-elements, means for movably connecting the guiding-shaft-trace-elements, with lateral flexibility, to the ends of the guiding-draft-whiffletree respectively, means for movably connecting the guiding-draft-whiffletree to the vehicle and means for movably connecting the guiding-shaft-trace elements respectively to the vehicle.

26. The combination, in a vehicle with a guiding draft-whiffletree centrally thereto relative to the draft thereof, of a pair of guiding shaft elements, means for movably connecting the guiding-shaft-elements to the ends of the whiffletree respectively, and means for movably connecting the guiding-shaft-elements respectively to the vehicle.

27. The combination, in combination shafts with a guiding-draft element, a whiffletree secured to the forward portion thereof, and an intervening guiding hinge connector hinged to the rear end thereof, of a shaft-trace-element provided with means for hinged connection with the end of the whiffletree and also provided at its rear end with a connecting slot opening downward when in normal hinged relations, and means for hingedly securing the upper end of the intervening hinge connector within said slot.

28. The combination, in combination shafts with a shaft-trace-element movable endwise and an upright guiding hinge connector, of a connector fitted to the rear end of the shaft-trace-element and provided with a slot therein opening downward and closed at the top, and means for hingedly securing the upper end of the upright hinge connector within said slot.

29. In combination, with a shaft-trace-element movable endwise and a guiding-hinge connector, a slotted connector having an oblong slot therein, means for securing the slotted connector to the rear end of the shaft-trace-element and means for hingedly securing the end of the guiding hinge connector within the slot of the slotted connector.

30. In combination, with a shaft-trace-element movable to and fro endwise and a guiding-hinge-connector, a slotted connector having an oblong slot therein limited in depth, and length and with engaging shoulders at the ends thereof, means for securing the slotted connector to the end of the guiding shaft element and means for hingedly securing the end of the guiding-hinge connector within said oblong slot of the slotted connector.

31. The combination of a guiding draft element, a whiffletree centrally hinged thereto and a pair of movable shaft trace-elements respectively hinged by a limited hinge joint to the whiffletree and means for hingedly uniting the rear ends of said shaft trace elements respectively with the rear end of the guiding-draft-element.

32. The combination of a guiding-draft-element, a whiffletree centrally hinged thereto, a pair of shaft-trace-elements respectively hinged to the whiffletree and a pair of guiding hinge connectors respectively hinging the rear end of the shaft trace elements to the guiding-draft-element.

33. The combination of a substantially-semi-circular guiding-draft-element, a whiffletree centrally hinged to the forward portion thereof, a pair of shaft trace-elements respectively hinged to the ends of the whiffletree, and also movably connected respectively to the rear ends of the guiding-draft-elements.

34. The combination of a substantially-semi-circular-guiding-draft-element, a whiffletree centrally hinged to the forward portion thereof, a pair of shaft-trace-elements respectively hinged to the whiffletree and also hingedly united to the rear end of the guiding-draft-element and movable endwise relative thereto.

35. The combination, in combination shafts, of a pair of shaft-trace-elements movable endwise, a whiffletree hingedly connecting the shaft-trace-elements, a guiding draft-element hinged to the center of the whiffletree, means movably connecting the rear ends of the shaft-trace-elements respectively to the guiding-draft-element, vehicle attaching means on the guiding-draft-element and harness attaching means on the shaft-trace elements respectively.

36. The combination, in combination shafts, with a guiding-draft-element, and a whiffletree centrally secured to the forward portion thereof and an intervening hinge connector hinged to the rear portion thereof, of a shaft-trace-element provided with means at its rear end for hinge connection with the end of the intervening hinge connector and provided also with means for hinged connection with the end of the whiffletree.

37. The combination, in combination shafts, with a whiffletree, a pair of shaft-trace-elements hingedly connected to the ends of the whiffletree respectively, and a pair of hinge connectors having their upper ends hingedly connected to the rear ends of the shaft-trace-elements respectively, of a substantially semi-circular guiding draft-element centrally hinged to the center of the whiffletree and means providing lateral transverse sockets at the ends respectively of said guiding draft element and means within said sockets for hingedly connecting the lower ends of said hinge connectors therewith respectively, and means for attaching the ends of said guiding draft elements respectively to a vehicle.

38. The combination, in combination shafts, with a whiffletree and a pair of movable shaft-trace-elements hinged to the ends of the whiffletree respectively, of a guiding draft element having the center of the whiffletree hinged to the forward portion thereof and the movable shaft-trace-element secured to the rear portion thereof and movable to and fro endwise relative thereto, and means respectively for vehicle and harness attachments.

39. The combination, with a whiffletree and a pair of shaft-trace-elements hinged respectively to the end of the whiffletree, of a substantially semicircular tubular guiding-draft-element, means for mounting the whiffletree on the forward portion thereof, and means for attaching the rear ends of the guiding-draft-element respectively to a vehicle and means for movably connecting the rear ends of the shaft trace elements respectively to the rear ends of the guiding-draft-element.

40. The combination, in combination shafts with a guiding shaft element, a substantially semi-circular guiding draft element provided at its ends respectively with a vehicle attaching device, and an upright guiding hinge connector, of means in combination with said vehicle attaching device for hingedly securing the lower end of said upright hinge connector to said vehicle attaching device and means for connecting the upper end of said guiding hinge connector to the guiding shaft element.

41. The combination, in combination shafts, with a guiding shaft element a substantially semi-circular guiding-draft-element and an upright guiding hinge-connector, of a triple-joint connector, said triple joint connector being provided with means for attachment to said guiding-draft-element, and with means for hinge connection with said upright guiding-hinge connector and also with means for attachment to a vehicle, and means for connecting the upright guiding hinge connector to the shaft trace element, substantially as and for the purposes set forth.

42. The combination, in combination shafts, with a substantially semi-circular guiding-draft-element and a guiding-shaft-element, of a triple-joint-connector, said triple-joint connector being provided with means respectively for attachment to the end of the guiding-draft-element, for movable connection with the guiding-shaft-element and for vehicle attachment.

43. The combination, in combination shafts, with a substantially semi-circular guiding-draft element and an upright guiding-hinge-connector, of a triple joint connector, said triple joint connector being provided with means respectively for fixed connection with the guiding-draft-element, for forward and back hinged connection with the guiding-hinge connector, and for vehicle attachment, a guiding shaft element and means for connecting said upright guiding hinge connector thereto.

44. The combination, in combination shafts, with a guiding-draft-element and a guiding-shaft-element, of a triple-joint-connector, means for connecting the triple-joint-connector to the guiding-draft-element by interlocking screw-threaded parts, means for movably connecting the guiding shaft-element to the triple-joint connector and means for attaching the triple-joint-connector to a vehicle.

45. The combination, in combination shafts with a guiding-draft-element and a movable guiding-shaft-element, of a triple-joint connector, means for connecting the triple-joint-connector respectively to the guiding-draft-element, to the movable guiding-shaft-element and to a vehicle.

46. The combination, in combination shafts with a guiding-draft-element and a movable guiding-shaft-element, of a triple-joint-connector, means for connecting the triple-joint-connector to the guiding-draft-element by interlocking screw-threaded parts and also secured against turning thereon by a bolt, means for movably connecting the guiding shaft element to the triple-joint connector and means for attaching the triple-joint-connector to a vehicle.

47. The combination, in combination shafts, with a guiding-draft-element, a whiffletree centrally secured to the forward portion of the guiding draft element and a movable shaft-trace element hinged to the end of the whiffletree, of a guiding hinge-connector intervening and hingedly connecting the rear end of the shaft-trace-element to the rear end of the guiding-draft-element by a pair of hinged joints.

48. The combination, in combination shafts, with a guiding-draft-element, a whiffletree centrally secured to the forward portion of the guiding-draft-element and a movable shaft-trace-element hinged to the end of the whiffletree, of a V-shaped hinge-connector intervening and hingedly connecting the rear end of the movable shaft-trace element to the guiding-draft-element by a pair of hinged joints.

49. The combination, in combination shafts, with a guiding draft element, a whiffletree hinged to the forward portion of the guiding-draft-element and a movable-shaft-trace element hinged to the end of the whiffletree and movable endwise relative to the guiding-draft element, of a V-shaped hinge-connector, composed of a single piece of metal beat into shape and bolt holes punched into the ends thereof for intervening and hingedly connecting the rear end of the movable shaft-trace-element to the guiding-draft-element.

50. The combination, in combination shafts, with a guiding-draft-element, a whiffletree hinged to the forward part of the guiding-draft-element and a movable shaft-trace-element hinged to the end of the whiffletree, of a V-shaped hinge-connector hinged at its upper end to the rear end of the movable shaft-trace-element and also having its open lower ends well spaced apart and hinged to the two sides of the guiding-draft element thereby restricting all side movement while providing forward and back hinge movement to the former relative to the shaft trace element.

51. The combination, in combination shafts, with a guiding-draft-whiffletree and a movable guiding-shaft element hinged to the end of the guiding-draft-whiffletree with lateral flexibility of parts, of a shoulder on the end of the whiffletree for engaging, and limiting the endwise hinge movement of, the guiding-shaft-element.

52. The combination, in combination shafts, with a guiding-draft-element, a whiffletree pivoted centrally to the guiding-draft-element and a movable shaft-trace-element hingedly secured to the end of the whiffletree and also movably secured to the guiding draft element and movable to and fro endwise relative thereto, of an engaging shoulder on the end of the whiffletree distanced from the shaft trace element and allowing the hinged endwise movement of the shaft-trace-element but limiting said movement by engagement with the corresponding element of the shaft.

53. The combination, in combination shafts with a guiding-draft-element, and a whiffletree centrally secured to the forward portion of the guiding-draft-element, of a movable shaft-trace-element hinged to the end of the whiffletree, by a limited hinge-joint providing a shoulder on the end of the whiffletree engaging the inner side of the shaft-trace-element, and means for movably securing the shaft-trace-element to the guiding-draft-element.

J. HAYS ALLIN.

Witnesses:
C. E. RICHMOND,
E. DEAN RICHMOND.

Copies of this patent may be obtained for five cents each, by addressing the "Commissioner of Patents, Washington, D. C."